July 2, 1957  E. E. MARTIN  2,797,972
INTERNALLY PRESSURIZED PISTON AND SEAL UNITS
Filed June 10, 1955  2 Sheets-Sheet 1
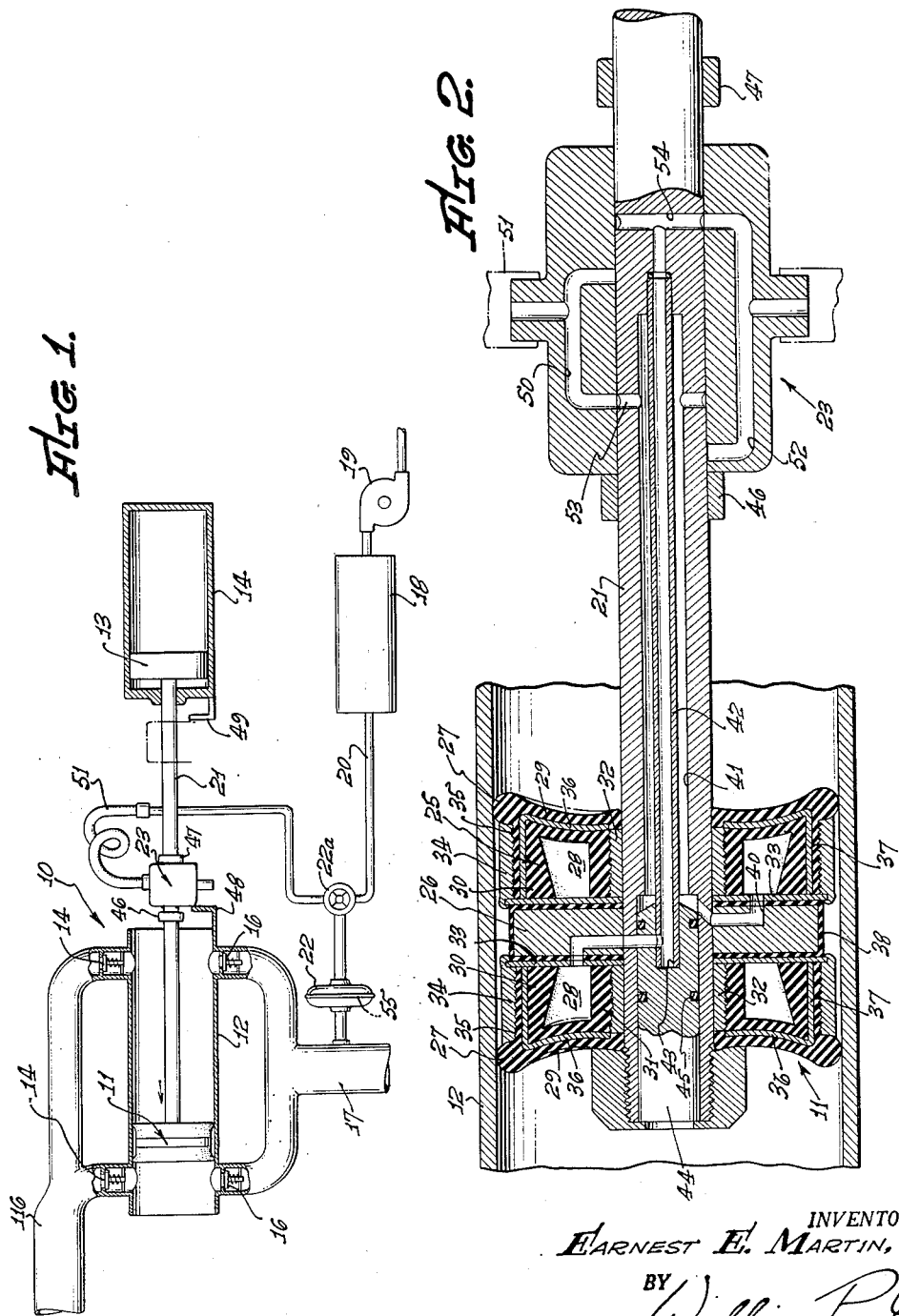
INVENTOR.
*Earnest E. Martin,*
BY *William P. Green*
ATTORNEY.

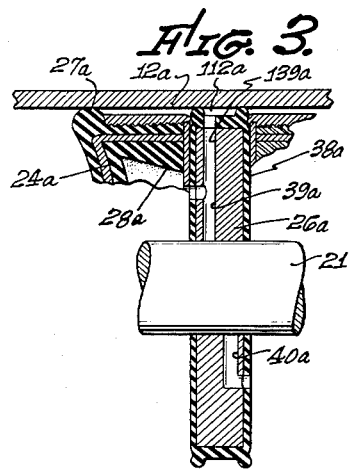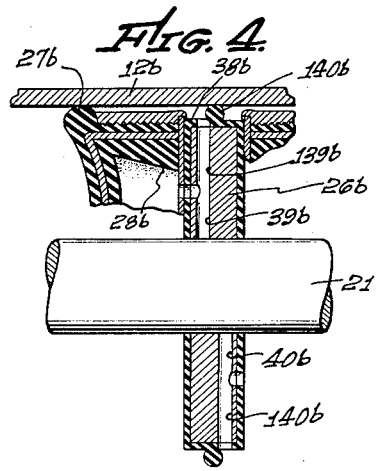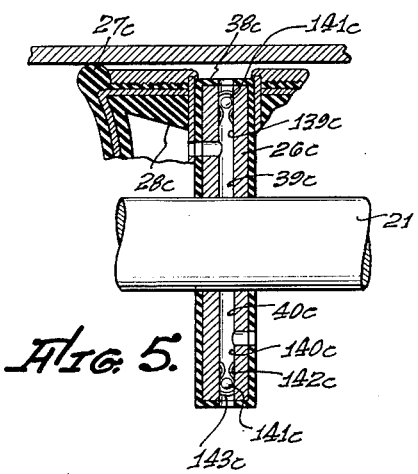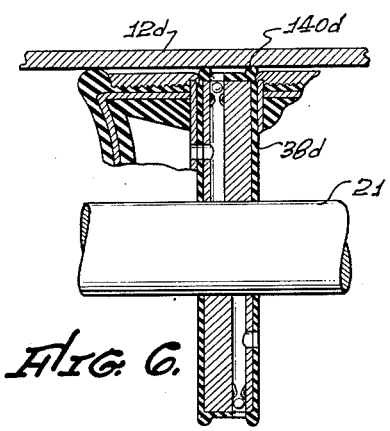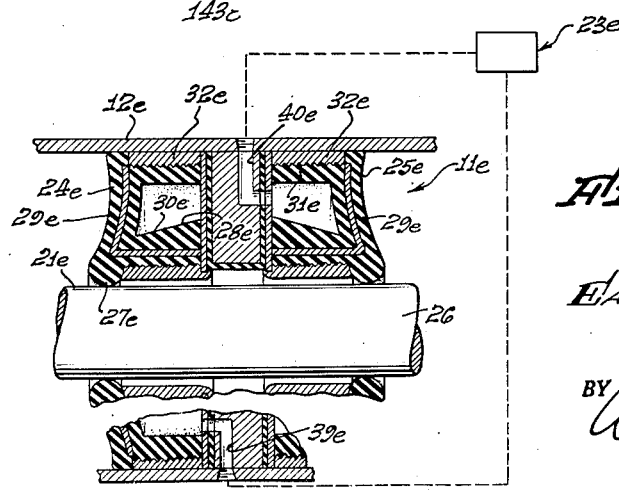

United States Patent Office 2,797,972
Patented July 2, 1957

2,797,972

INTERNALLY PRESSURIZED PISTON AND SEAL UNITS

Earnest E. Martin, Glendora, Calif., assignor to Ralph W. Walsh, Westminster, Calif.

Application June 10, 1955, Serial No. 514,550

18 Claims. (Cl. 309—31)

This invention relates to improved seal structures for forming fluidtight seals between a pair of coacting members, such as a piston and a cylinder. In certain respects, the devices of the present invention may be considered as improvements on the type of sealing units disclosed in my Patent No. 2,709,118, issued May 24, 1955, entitled "Seals for Pistons and the Like"; and my copending application "Flexible Bodied Seal Units," Serial No. 504,982, filed April 29, 1955, now Patent No. 2,739,856, issued March 27, 1956; and copending application "Pressure Responsive Seal Units," Serial No. 504,760, filed April 29, 1955, now Patent No. 2,727,471, issued December 20, 1955.

The seal units embodying the invention are of a type including a body or a pair of bodies of elastomeric material, such as rubber, carrying one or more seal lips for forming a fluidtight seal with a cylinder wall or other coacting member. The major object of the invention is to provide an arrangement of this type in which the tightness of the engagement between the sealing lips and the coacting member is very positively controlled, in a manner such that effective seals are maintained while at the same time avoiding the development of excessive friction between the lips and engaged surfaces. Preferably, two sealing lips are provided, and the engagement of these lips is such that a lubricating, cleaning or cooling liquid may be fed under pressure into the space between the two lips and will be essentially confined within that space.

In accordance with the invention, I attain the desired control over the sealing force applied to the lip or lips by providing the piston or other seal unit with an inner cavity into which pressurized liquid is fed, at a location tending to deform the elastomeric material of the unit in a manner exerting a controlling force on the sealing lips. Preferably, the elastomeric material forms an essentially radially extending wall which is more flexible axially than a lip carrying portion of the material connected to one radial extremity of the wall, so that flexure of the wall tends to apply a radial force to the lip carrying portion to either increase or relieve the lip pressure as may be desired in a particular case. If it is desired to increase the sealing force of the lip, the radial wall may be bowed in a manner such that its flexure tends to increase the radial extent of the wall and thereby increase the sealing force. If a reverse action is desired, the wall may be designed to exert a pulling force away from the cylinder wall or other coacting surface when the wall is flexed.

Desirably, the piston or other sealing unit contains two such pressurized cavities for controlling the sealing force of two spaced lips respectively. The application of internal liquid pressure to the unit may be controlled by valve means actuated in timed relation to the piston. Preferably, these valves deliver pressure fluid to the two cavities alternately and in accordance with the reciprocating movement of the piston. The two lips may thus be controlled during both strokes of the piston in a manner substantially continuously confining a lubricant or other liquid between the two lips. Also, this liquid may be confined by suitable additional seals to any desired localized area between the two lips.

The above and other features and objects of the present invention will be better understood from the following detailed description of the typical embodiments illustrated in the accompanying drawings in which:

Fig. 1 is a partially diagrammatic view of a mud pump unit constructed in accordance with the invention;

Fig. 2 is an enlarged fragmentary axial section through the piston and valve units of the Fig. 1 apparatus; and Figs. 3 to 7 are fragmentary representations of four variational forms of pistons embodying the invention.

In Figs. 1 and 2, I have represented the invention as it may be applied to a piston and cylinder mechanism 10, including a piston 11 mounted for reciprocation within a cylinder 12. This mechanism 10 may typically be considered as being an oil well mud pump, whose piston 11 is driven by a steam operated reciprocating power piston 13, contained within a power cylinder 14. The pump is of the double acting type, serving to pump mud or other fluid at both sides of the piston, with the fluid being drawn into the opposite ends of the piston past a pair of spring pressed inlet check valves 14 communicating with the common suction or inlet header 116. Mud under pressure is discharged from both ends of the cylinder 12 past a pair of spring pressed discharge check valves 16 to a common discharge or outlet header 17.

The invention is particularly concerned with the internal pressurizing of pump piston 11 by means of a liquid, such as water, which is fed to the piston from a pressurized supply tank 18 in which the pressure of the water is maintained constant and desirably at a value somewhat higher than the maximum pressure of the mud in cylinder 12. The water pressure in supply chamber 18 may be maintained by a suitable feed pump represented at 19. Water from tank 18 is fed to the piston through a line 20 and a rigid piston rod 21 which interconnects pistons 11 and 13. The flow of liquid to the interior of piston 11 is controlled by a pressure regulating valve 22 responsive to the mud pressure, and a reciprocating slide valve 23 disposed about rod 21 and acting to alternately admit pressure liquid to two different cavities in piston 11.

Referring now to Fig. 2, piston 11 includes two annular bodies 24 and 25 of elastomeric material, such as rubber, positioned at opposite sides of a rigid transverse annular backing member 26. Elastomeric bodies 24 and 25 form a pair of axially spaced radially outwardly projecting sealing lips 27, typically of the illustrated essentially circular transverse section, which lips annularly and slideably engage the wall of cylinder 12 to form fluidtight seals with that wall. Bodies 24 and 25 contain a pair of annular inner recesses 28, into which the pressurized water or other liquid from tank 18 is fed, to control the force exerted by lips 27 against cylinder 12. Each recess 28 is defined at one side by an annular essentially radially extending axially flexible wall 29 formed by the elastomeric material of body 24 or 25, and connected at its radially outer extremity to an essentially axially extending portion 30 of the elastomeric body. The radially inner extremity of each wall 29 connects with a second axially extending portion 31 of the body 24 or 25, which axial portion 31 is bonded to the outer irregularized surface of an inner carrying ring 32 which is a pressed fit on the outer surface of rod 21. In extending radially outwardly, each of the radial walls 29 preferably has a normally bowed cross-sectional configuration, such as is represented in full lines in Fig. 2, so that walls 29 present somewhat convexly curved surfaces facing inner backing member 26, and concavely curved surfaces at their opposite or outer sides.

At opposite sides of backing member 26, there are provided a pair of annular rigid transverse preferably metal backing plates 33, which are held by parts 32 and 26 against axial displacement. Abut their outer edges, plates 33 are rigidly attached to a pair of annular rings 34, which extend along the outside of and are continuously bonded to portions 30 of elastomeric bodies 24 and 25, rings 34 desirably having irregularized surfaces 35 continuously bonded to the elastomeric material. To effect the desired connection between parts 34 and 33, so that parts 34 and portions 30 of the elastomeric bodies are retained against axial displacement away from backing plates 26, rings 24 may be annularly peened about the outer edge portions of plates 33.

As will be apparent, bodies 24 and 25 are less free for axial flexure in either axial direction at the location of portion 30 than are these bodies at the locations of radial walls 29. These radial walls 29 are adapted to be flexed inwardly toward backing member 26 by pressure exerted against their outer sides, and are adapted to be flexed axially outwardly by pressure exerted against their inner sides from within recess 28. Such axial flexure of walls 29 is yieldingly resisted by the elasticity of bodies 24 and 25, and also by annular spring steel inserts 36 embedded within the elastomeric bodies. These inserts 36 may have first essentially radially extending somewhat bowed portions following the contour of walls 29, and may have second axially extending portions 37 projecting into engagement with plates 33. If desired, the radially extending portions of spring steel plates 36 may be suitably apertured to decrease their resistance to flexure to a desired value.

The transverse side walls and outer peripheral surface of rigid metal backing member 26 may be coated by and bonded to an outer layer of rubber or other elastomeric sealing material 38, for forming a fluid tight seal with plates 33. Pressurizing liquid is fed to and discharged from one of the inner recesses 28 through a passage 39 in member 26, and registering apertures in coating 38 and plate 33. Similarly, pressure fluid is fed to and discharged from the other recess 28 through a passage 40 and registering apertures in parts 33 and 38. Passage 40 communicates with an inner bore 41 extending within rod 21 to the location of control valve unit 23. Passage 39 communicates with the interior of an inner tube 42 extending within rod 21 and connected at its piston end into a bore 43 formed in a member 44 which is sealed with respect to the wall of the rod by a pair of spaced seal rings 45. As will be apparent, the interior of tube 42 communicates with passage 39 through registering apertures in parts 42, 44 and 21.

Valve unit 23 is an annular slide valve element disposed about rod 21 and axially movable along the rod between positions of engagement with a pair of stop members 46 and 47 rigidly carried by the rod. The slide valve 23 is actuated between these two positions at the end of each piston stroke by engagement of the slide valve with a pair of stationary stop members 48 and 49. The pressurized water or other liquid from tank 18 flows from line 20 to an inlet passage 50 in valve body 23 through a flexible feed line 51, whose flexure allows for the movement of valve unit 23 with its carrying rod 21. Liquid is discharged from the valve unit through an outlet passage 52. During leftward movement of the piston, valve element 23 is received adjacent stop 46, so that the pressurized liquid from tank 18 is fed through passage 50 and a registering passage 53 in the piston rod into the space between rod 21 and tube 42, to thus flow into the right hand recess 28 of the piston. At the same time, the liquid is being discharged from the other recess 28 through tube 42 and a communicating transverse passage 54 in the piston rod into the discharge passage 52. During rightward movement of the piston, when valve 23 is received adjacent stop 47, liquid from tank 18 is fed into tube 42 and through it to the left hand recess 28, with the other recess being placed in communication with discharge passage 52 in the valve.

The control valve 22 may or may not be connected into line 20, depending upon the operating circumstances of the particular piston installation. Where the operating pressures may vary through a considerable range, it is usually desirable to employ such a pressure regulating valve as that shown at 22. This valve 22 is of the conventional diaphragm type, containing a diaphragm 55 which is exposed at one side to the mud or other pressurized liquid in discharge header 17, and which actuates valve element 22a to vary the pressure of the liquid fed to the interior of the piston in accordance with variations in the discharge pressure of pump 10. That is, if the discharge pressure of the pump, and consequently the pressure exerted against the outer sides of piston 11, increases, valve 22 acts to automatically and correspondingly increase the pressure of the water or other liquid which is fed to the inner recesses 28 of piston 11.

In discussing the operation of the form of the invention shown in Figs. 1 and 2, assume first that the valve unit is in the position shown in Fig. 2, and that the piston and valve unit are moving together in a leftward direction, as seen in that figure. During such movement, the piston is exposed to much greater mud pressure at its left side than at its right or suction side. This rather great pressure at the left side of piston 11 acts to flex the radial wall 29 of body 24 to the right, say to the broken line position of Fig. 2, to thus increase the bow of that wall. At the location of outer portion 30 of body 24, that body is restrained against corresponding axial flexure, and as a result the flexure of wall 29 tends to apply a radially inward force to the connected lip 27, to thus counteract the normal tendency for radial expansion of that lip against the cylinder wall by the pressure, so that a very light but effective sealing engagement between lip 27 and the cylinder wall may be maintained even though the pressure at the lip is very high. This of course minimizes the friction and wear on the leading lip 27 as the piston moves to the left.

Still assuming that the piston is moving to the left, but considering the condition of the right hand elastomeric body 25, it will be noted that during such leftward movement of the piston, valve unit 23 is in a position for feeding water or other liquid from tank 18 into the right hand recess 28 within body 25. This high pressure liquid overcomes the relatively low pressure at the right hand side of piston 11, to flex radial wall 29 of body 25 to the right, say to the broken line position of Fig. 2. Since the outer portion 30 of body 25 is less free for axial flexure than wall 29, this wall flexes in a manner decreasing its bow and thus tending to force lip 27 of body 25 radially outwardly, to thus overcome the normal tendency for the reduced pressure at the suction side of the piston to pull this lip inwardly away from the wall. Thus, an effective but light seal is maintained at the trailing lip 27, as well as at its leading lip. When the piston reaches the end of its leftward stroke, valve element 23 engages stop 48, to shift the valve along rod 21 to a position adjacent stop 47. This allows the pressurizing liquid to discharge from the right hand recess 28 of the piston, and fills pressurized liquid into the left hand recess, so that the walls 29 may bow to the left during the next successive rightward stroke of the piston, to relieve the tendency for too tight an engagement of the leading or right hand lip with the cylinder wall and to overcome the tendency for too light an engagement of the trailing lip 27 with the cylinder wall. If the discharge pressure of the pump 10 is altered, as where it may be desired to force the pumped mud to an increased well depth, regulator valve 22 automatically responds to the increased discharge pressure of the pump to correspondingly increase the pressure within recess 28, so that the effect of the internal pressurization is increased to compensate for the change in pump pressure.

Fig. 3 represents fragmentarily a variational form of piston, which is identical with that of Fig. 2 except for the fact that some of the liquid from tank 18 is fed to the periphery of the piston, for lubricating, cleaning, or otherwise improving the operation of the piston and cylinder apparatus. More specifically, in Fig. 3, the passage 39a in backing member 26a (corresponding to passage 39 in member 26 of Fig. 2) may have an outer extension 139a leading to the space between member 26a and the cylinder wall 12a. The liquid thus fed to space 112a adjacent the cylinder wall may be confined between a pair of outwardly projecting axially spaced sealing projections 140 formed by the elastomeric material 38a which coats member 26a, these projections being in annular sealing engagement with the cylinder wall. Passage 39a of course communicates with recess 28a in body 24a, while a second passage 40a communicates with a second recess 28a in body 25a. The functioning of the Fig. 3 piston is thus identical with that of Figs. 1 and 2, except that during the rightward strokes of the piston, pressurized water or other liquid is fed to the space 112a at the periphery of the piston, as well as being fed into the recess 28a in body 24a.

Fig. 4 shows another form of the invention which is similar to that of Fig. 3, except that the elastomeric material 38b coating backing member 26b forms but a single outer sealing projection 140b for engaging the cylinder wall 12b. Also, each of the two passages 39b and 40b (corresponding to passages 39 and 40 of Fig. 1) has an outer continuation 139b or 140b communicating with the periphery of the piston. One of these passages 139b may feed pressurized water or other liquid to the space between a first of the lips 27b and ring 140b, while the second passage 140b acts on the opposite stroke of the piston to feed water to the space between ring 140b and the second of the sealing lips 27b. Of course, the two passages 39b and 40b also feed liquid to the two recesses 28b on alternate strokes of the piston, in the same manner as in the Figs. 1 and 2 form of the invention. If desired, the water pressure and other conditions in the Fig. 4 device may be controlled so that during a predetermined portion of each stroke, typically during the final portion of each stroke, a small amount of the liquid at the periphery of the piston may force its way past one of the lips 27b toward the outer side of the piston to thus intermittently and regularly clean these lips. This cleaning effect may be especially desirable in the case of mud pumps where the material being handled is extremely abrasive and harmful to the sealing lips.

Fig. 5 shows another form of the invention which is similar to that of Fig. 4, but in which the elastomeric coating material 38c on backing member 26c does not at any point form a seal with the cylinder wall. In this Fig. 5 arrangement, the two passages 39c and 40c feed pressurized liquid to the tube recesses 28c respectively, and also feed pressurized liquid through passage extensions 139c and 140c and past ball check valves 141c in those passages to the space radially between the piston and cylinder and axially between the two lips 27c. Ball check valves 141c coact with seats 142c to allow radially outward flow of pressurized liquid while preventing radially inward flow of the liquid, the outward movement of the check valves themselves typically being limited by apertured fluid passing cages 143c. As will be apparent, the Fig. 5 arrangement acts to maintain pressurized liquid in the space between the piston and cylinder continuously and during both strokes of the piston, while the liquid is fed to each of the internal recesses 28 during movement of the piston in only one direction.

Fig. 6 represents a form of the invention which is the same as that shown in Fig. 5 except that the elastomeric material 38d forms a pair of seal rings 140d for annularly engaging the cylinder wall 12d, and thus isolating the pressurized liquid in the space between seal rings 140d.

Fig. 7 represents a seal unit 11e embodying the invention, and which forms a fluid tight seal between an outer tubular structure 12e and an inner relatively movable shaft 21e. Unit 11e is in this case mounted stationarily to outer unit 12e, while the inner rod 21e may be rotatable or axially reciprocable within unit 11e. The unit 11e includes a pair of rings 32e which are pressed fits within tube 12e, and to whose inner serrated surfaces the axially extending portions 31e of elastomeric bodies 24e and 25e are bonded. Bodies 24e and 25e form bowed essentially radially extending axially flexible walls 29e, which are attached at their inner extremities to axially extending portions 30e of the bodies, and annular seal lips 27e which engage shaft 21e. Rigid backing unit 26e is formed the same as in Figs. 1 and 2, except that passages 39e and 40e are supplied with the pressurized liquid for cavities 28e through passages in body 12e, rather than shaft 21e. The pressurized liquid may come to passages 39e and 40e from a valve unit typically represented at 23e, which unit is similar to unit 23 of Fig. 2, and acts to supply liquid to recesses 28e respectively during movement of the shaft 21e in each of its two opposite axial directions respectively. Also, in some instances, it may be desirable to continuously pressurize both of the recesses 28e. Further, it will be apparent that the inner backing unit 26e may be changed to supply liquid also to the space radially between shaft 21e and seal unit 11e, in manners corresponding to any of the arrangements disclosed in Figs. 3 to 6. The pressurizing of recesses 28e in Fig. 7 functions in the manner discussed in connection with Fig. 2, to exert an axially outward flexing force on walls 29, to thus tend to tighten the engagement between lips 27e and shaft 21e where necessary, and also a reverse or axial inward flexure of walls 29e resulting from the application of fluid pressure to their axially outer sides tends to relieve the lips 27e radially outwardly to counteract the tendency for such pressure to cause too tight an engagement between lips 27e and shaft 21e.

I claim:

1. A fluid sealing unit for forming an annular seal with a coacting relatively movable member to prevent fluid flow between two opposite sides of the unit, said unit including a body at least partially formed of elastomeric material and containing an internal cavity which is isolated against direct communication with the fluid at either of said opposite sides of the unit, means for conducting fluid under pressure into said cavity to flex said elastomeric material by force exerted against the interior thereof, said elastomeric material having a portion forming an essentially radially extending elastic wall defining an axially flexible side wall of said cavity and exposed at an inner side to the fluid in the cavity, there being a space at an opposite side of said wall allowing axial flexure of the wall by said pressure fluid in the cavity, said elastomeric material having a second portion attached to one radial extremity of said wall and carrying a sealing lip adapted to annularly and slidably engage a surface of said coacting member, means restraining axial flexure of said second portion of the elastomeric material to an extent such that said fluid in the cavity axially flexes said wall more than said second portion of the elastomeric material, whereby said wall when axially flexed by the fluid in said cavity tends to apply a radial force to said lip urging it radially relative to said member.

2. A fluid sealing unit as recited in claim 1, in which said body forms a second of said internal cavities into which pressure fluid is fed and having a second of said axially flexible walls, and a second of said sealing lips controlled by said second flexible wall, said second lip being spaced axially from the first lip.

3. A fluid sealing unit as recited in claim 2, in which there are passage means in the unit for conducting said pressurized fluid to the space axially between said lips and radially between said unit and said member.

4. A fluid sealing unit as recited in claim 2, including valve means for alternately admitting pressure fluid to said two cavities respectively.

5. A fluid sealing unit as recited in claim 1, in which said unit is a piston having said sealing lip about the periphery thereof, said wall being normally bowed toward said cavity to exert a radially outward force against said member as a result of said flexure of the wall.

6. A fluid sealing unit as recited in claim 1, in which said unit is a piston having said sealing lip about the periphery thereof.

7. A fluid sealing unit as recited in claim 1, in which unit is a reciprocable piston having said sealing lip about the periphery thereof, said member comprising a cylinder, there being valve means for controlling the admission of fluid to said cavity, and means in accordance with the movement of said piston.

8. A fluid sealing unit as recited in claim 1, in which there is a second of said lips spaced from the first, there being passage means in the unit for conducting pressurized fluid to the space axially between said lips and radially between said unit and said member.

9. A fluid sealing unit as recited in claim 1, in which said unit is a reciprocable pump piston received in a cylinder and acting to pump a fluid therein, and means for controlling the pressure of fluid in said cavity in accordance with the pressure of the fluid pumped by said piston.

10. A piston unit to be mounted for reciprocating movement within a cylinder and adapted to form a seal between fluid at opposite sides of the piston, comprising two bodies of elastomeric material at opposite axial sides of the piston, each of said bodies containing a recess and having a portion defining an essentially radially extending axially flexible wall at an axially outer side of the recess, said recesses being isolated against direct communication with the fluid at said opposite sides of the piston, each of said bodies having a radially outer portion carrying a sealing lip annularly engageable in sealing relation with said cylinder, means restraining said outer portions of the bodies against axial flexure to an extent such that said outer portions are less free than said walls for axial flexure, whereby axial flexure of each of said walls applies a radial force to the carried lip, there being passage means in said unit for conducting pressurized fluid into said recesses to flex said walls and thereby apply radial forces to said lips.

11. A piston unit as recited in claim 10, including valve means for alternately admitting pressure fluid to said recesses in accordance with the reciprocal movement of said piston.

12. A piston unit as recited in claim 11, in which said piston unit includes a piston rod, and said valve means comprise a valve unit disposed about and shiftable relative to said rod.

13. A piston unit as recited in claim 10, including means for conducting pressurized liquid through the interior of said piston unit to a space axially between said lips and radially between the piston and cylinder.

14. A piston unit as recited in claim 10, in which said passage means include two passages in said piston leading pressurized liquid to said recesses respectively, valve means for alternately admitting pressurized liquid to said two passages respectively in accordance with reciprocal movement of the piston, there being two auxiliary passages leading said liquid from said two first mentioned passages respectively to a space axially between said lips and radially between the piston and cylinder, and check valves preventing reverse flow through said auxiliary passages from said space and back into said first mentioned passages.

15. A piston unit as recited in claim 14, in which said flexure restraining means comprise a rigid backing unit between said elastomeric bodies and containing said first mentioned and auxiliary passages, there being elastomeric material on said backing unit in addition to said bodies forming two axially spaced auxiliary seal lips between which said liquid in said space is confined.

16. A piston unit as recited in claim 10, in which said flexure restraining means comprise a rigid backing unit between said elastomeric bodies, there being elastomeric material on said backing unit forming two spaced auxiliary seal lips between said two first mentioned lips and engageable with the cylinder, said passage means comprising two passages in said backing unit leading to said recesses respectively, there being an auxiliary passage in said backing unit leading pressurized liquid from one of said two first mentioned passages to a space axially between said auxiliary lips and radially between the piston and cylinder.

17. A piston unit as recited in claim 10, in which said flexure restraining means comprise a rigid backing unit between said elastomeric bodies, there being elastomeric material on said backing unit forming an auxiliary seal lip between said two first mentioned lips and engageable with the cylinder, said passage means comprising two passages in said backing unit leading to said recesses respectively, there being two auxiliary passages leading pressurized liquid from said two first mentioned passages respectively to spaces at opposite sides of said auxiliary lip and radially between said piston and cylinder.

18. A piston unit as recited in claim 17, including valve means for alternately admitting pressurized liquid to said two first mentioned passages respectively in accordance with the reciprocal movement of said piston.

References Cited in the file of this patent

UNITED STATES PATENTS

| 1,678,365 | Sutliff | July 24, 1928 |
| 1,818,187 | Bailey | Aug. 11, 1931 |
| 1,828,056 | Lamb | Oct. 20, 1931 |
| 1,849,096 | Kibele | Mar. 15, 1932 |
| 2,732,268 | Duval | Jan. 24, 1956 |
| 2,749,195 | Krüger | June 5, 1956 |
| 2,753,230 | Mosites | July 3, 1956 |